US006701664B2

United States Patent
Ahm

(10) Patent No.: US 6,701,664 B2
(45) Date of Patent: Mar. 9, 2004

(54) SEED TAPE FOR A CONTROLLED GERMINATING PROCESS

(75) Inventor: Poul Henrik Ahm, Altea (ES)

(73) Assignee: Bentle Products AG, Zug (CH)

( * ) Notice: Subject to any disclaimer, the term of this patent is extended or adjusted under 35 U.S.C. 154(b) by 0 days.

(21) Appl. No.: 10/182,892

(22) PCT Filed: Feb. 2, 2001

(86) PCT No.: PCT/DK01/00077

§ 371 (c)(1),
(2), (4) Date: Aug. 1, 2002

(87) PCT Pub. No.: WO01/56361

PCT Pub. Date: Aug. 9, 2001

(65) Prior Publication Data

US 2003/0000140 A1 Jan. 2, 2003

(30) Foreign Application Priority Data

Feb. 3, 2000  (DK) .......................................... 2000 00178

(51) Int. Cl.⁷ ................................................. A01C 1/04
(52) U.S. Cl. ............................. 47/56; 111/199; 53/467; 47/15; 47/9
(58) Field of Search .................... 47/56, 15, 9; 53/467; 111/199

(56) References Cited

U.S. PATENT DOCUMENTS

| | | | | |
|---|---|---|---|---|
| 3,659,396 A | * | 5/1972 | Baker ........................ | 53/546 |
| 3,955,319 A | * | 5/1976 | Smith ........................ | 47/9 |
| 4,173,844 A | * | 11/1979 | Knolle et al. ................ | 47/56 |
| 4,250,660 A | * | 2/1981 | Kitamura et al. ............ | 47/57.6 |
| 4,272,919 A | * | 6/1981 | Schmidt ..................... | 47/56 |
| 4,283,880 A | * | 8/1981 | Fjeldsa ...................... | 47/56 |
| 4,584,790 A | * | 4/1986 | Gaughen ................... | 47/56 |
| 4,866,879 A | * | 9/1989 | Wood et al. ................ | 47/56 |
| 4,910,911 A | * | 3/1990 | Ahm ......................... | 47/56 |
| 5,101,594 A | * | 4/1992 | Ahm ......................... | 47/56 |
| 5,201,141 A | * | 4/1993 | Ahm ......................... | 47/67 |
| 5,317,834 A | * | 6/1994 | Anderson .................. | 47/48.5 |
| 5,417,010 A | * | 5/1995 | Ecer ......................... | 47/56 |
| 5,585,150 A | * | 12/1996 | Sheehan .................... | 428/15 |
| 5,720,129 A | * | 2/1998 | Lantinberg ................. | 47/56 |
| 5,759,929 A | * | 6/1998 | Ikezawa et al. ............ | 442/385 |
| 5,860,245 A | * | 1/1999 | Welch ....................... | 47/56 |
| 5,866,269 A | * | 2/1999 | Dalebroux et al. ......... | 428/537.5 |
| 5,887,382 A | * | 3/1999 | Marshall et al. ............ | 47/56 |
| 5,934,011 A | * | 8/1999 | Ishioka et al. .............. | 47/56 |
| 6,029,395 A | * | 2/2000 | Morgan ..................... | 47/9 |
| 6,065,601 A | * | 5/2000 | Weder ...................... | 206/457 |
| 6,324,781 B1 | * | 12/2001 | Stevens ..................... | 47/9 |
| 6,389,745 B1 | * | 5/2002 | Huh .......................... | 47/56 |
| 6,446,386 B1 | * | 9/2002 | Holloway ................... | 47/56 |
| 6,460,473 B1 | * | 10/2002 | Onodera et al. ........... | 111/199 |

FOREIGN PATENT DOCUMENTS

GB        2321000 A    *  7/1998  ............ A01C/1/04

* cited by examiner

Primary Examiner—Peter M Poon
Assistant Examiner—Andrea M. Valenti
(74) Attorney, Agent, or Firm—Cooper & Dunham LLP; Donald S. Dowden

(57) ABSTRACT

Seed tape (1) for a controlled germinating process is made of at least two paper layers (1' and 1") and is intended to be used while placed edgewise. Each germinating unit includes a seed (5), additives (6) and a carrier (8). Each germinating unit (1a, 1b, 1c, 1d) is formed as a planar member. The longitudinal axis of each planar member extends substantially transverse to the longitudinal direction of the tape. The additives are places in discrete locations around the seed. The seed, the additives and the carrier are adhered to the inner face of at least one paper layer (1'), which is air-permeable. A narrow stripe (10) of water-absorbing, super-absorbing polymer (SAP) is placed on the adhesive layer of at least one paper layer (1' or 1"). The resulting seed tape is particularly suited for providing a controlled moist microclimate around the seeds during a two-step germinating process.

6 Claims, 5 Drawing Sheets

SEED TAPE FOR A CONTROLLED GERMINATING PROCESS

TECHNICAL FIELD

The invention relates to a seed tape for a controlled germinating process and comprising successively arranged germinating units, where said germinating units, if desired, can be cut off one by one, said seed tape being made of at least two paper layers and intended to be used while arranged edgewise, and where each germinating unit includes a seed, additives and a carrier.

BACKGROUND ART

The term "paper layer" is here to be construed not only as a layer of paper; this layer can be made of a multitude of materials.

The additives may in principle comprise all substances compatible with the remaining selected materials and agents having a favourable effect on the storage, germination, and growth of the seed and the subsequent sprout. The additives may for instance comprise: pesticides, including herbicides, insecticides, especially systemic insecticides, fungicides, virae, cultures of bacteria, cultures of fungi, such as Trichoderma, fungus spores, microencapsulated fungicides, eggs from useful insects, such as predatory nematodes, insect eggs, fertilizers, hormones, enzymes, animal repellants, pH-adjusting agents, carbon, clay particles, trace elements, such as molybdenum, wood fibres or wood powder, kieselguhr, surfactants, silica and other additives with favourable effects on the germination and the growth of plants, where several substances are available in microencapsulated form with the result that they are protected against biodegradation and a controlled release thereof can be carried out. The additives can also include potassium nitrate and sodium chloride.

The term "carrier" is here to be construed as one or more of the substances: silica, vermiculite, perlite, zeolite, cellulose materials, such as wood fibres, sphagnum, clay, optionally burned clay, mineral fibres, such as rock wool or the like substances, whereby it is possible to obtain a desired degree of water retaining capacity, water conveying capacity, ion exchanging properties etc.

It is known to subject the seeds to priming before they are positioned in a seed tape.

A seed tape is known which comprises sleeves arranged at regular intervals and formed by two opposed wall-forming layers of paper, where one layer of paper on the outside is provided with a coating, and where the sleeves include seeds and various agents, such as growth-adjusting agents. However, this tape is not particularly suited for a two-step germinating process, viz. initially a step involving a priming of the seeds where just enough water is fed for starting the life process of the seed followed by a stop for a period, and then a step involving the germination where the seed leaves and the radicles appear and where a controlled moist microclimate simultaneously surrounds the seed. The latter is not totally satisfactory.

BRIEF DESCRIPTIONS OF THE INVENTION

The object of the invention is to provide a seed tape of the above type which is of a particularly simple structure and consequently easy to manufacture, and which is particularly suited for providing a controlled moist microclimate around the seeds during a two-step germinating process and especially for providing sufficient air around said seeds and the developing radicles during said process.

The seed tape according to the invention is characterised in that each germinating unit is formed as a planar member, the longitudinal axis of which extends substantially transverse to or inclined relative to the longitudinal direction of the seed tape, and that the additives and the carrier are present in form of a granulate and are arranged in discrete positions around the seed, air applying between said seed and the additives and the carrier, and that the seed, the additives and the carrier are adhered to the per se rather air-permeable paper layer by means of a layer of adhesive on the inner side of at least one paper layer, and that at least one, optionally rather broad stripe of water-absorbing, super-absorbing polymer (SAP) is placed on said adhesive layer inside each planar member, said polymer (SAP) extending across the seed or past said seed at a short distance therefrom and such that it at least reaches one end of the planar member when seen in a direction perpendicular to the longitudinal direction of the seed tape. As a result, a high structural simplicity and an easy manufacture of the seed tape are obtained. In addition it is ensured that as the seeds are arranged in the tape it is possible during the first step of the germinating process, viz. during the priming, to provide a controlled moist climate around the seeds adjusted to said germinating process with a suitable amount of air (oxygen) inter alia because the paper layer is air-permeable, and during the second step of said germinating process it is possible to ensure sufficient air in the area around the developing radicles. The seed can be subjected to an efficient priming inside the tape by feeding of a first small amount of water to the SAP. During the second germinating step where additional water is fed to the seed tape, it is also ensured that the developing radicle of the germinating unit can be correctly orientated because said seed is fixed in the germinating unit and the user always knows which side of said germinating unit, i.e. the seed, is facing up or downwards. The seed tape is particularly suited for a wide range of vegetables, such as lettuce, cabbage and carrots, spinach and onions as well as industrial crops, such as sugar beets, tobacco, tomatoes and corn.

When the seed is placed in the uppermost portion, preferably the uppermost fourth part of the germinating unit, the stripe of SAP-material, especially the portion of the stripe being above the seed in the bedded out state of said germinating unit, may according to the invention be admixed a hydrophilic material, such as silica powder, clay particles, vermiculite or perlite with the result that a capillary effect is obtained between the SAP-grains and the seed, and accordingly an improved fluid transfer from the SAP-grains to the seed is obtained. As a result an improved control of the microclimate around the seed is obtained at the same time as it is possible to supply a predetermined amount of light.

According to the invention the size and amount of the SAP-grains are selected such that the SAP can at least hold $\frac{1}{20}$ of the amount of water which is necessary for provoking the completing germinating process in the seed. In this manner it is ensured that at least the priming of the seeds can be carried out.

The layer of adhesive may according to the invention advantageously cover the entire inner side of at least one paper layer, and the adhesive layer may preferably be made of many substantially very narrow and abutting lines of adhesive, said lines of adhesive extending substantially parallel to the longitudinal direction of the seed tape or perpendicular thereto or in both directions.

Moreover the substantially parallel adhesive lines of the adhesive layer may according to the invention form an angle with the longitudinal direction of the seed tape of 45 to 70°, preferably 50 to 60°, whereby it is ensured that the radicle resulting from the seed can be controlled to a predetermined degree in a specific direction relative to grains of depot substances, such as clinical and biological pesticides.

In addition, the said adhesive layer may according to the invention be formed by many closely juxtaposed adhesive drops. As a result each planar member in the seed tape discloses a high form stability.

Moreover the adhesiveness of the used adhesive may according to the invention be slightly weaker than the expansion force exerted by the polymer material when it is caused to absorb water, said adhesive preferably presenting an adhesiveness of less than approximately 28 g*/cm, preferably 20 g*/cm measured by the method indicated in the present description. In this manner it is ensured that during the watering of the seed tape sufficient room is provided for allowing the swelling polymer grains to press portions of the paper layers slightly away from one another while suppressing the adhesiveness of the adhesive, whereby the tensions in said paper layers do not become too strong.

In addition, the lower portion of both paper layers may according to the invention be folded to the same side, said lower portion preferably being of a width of 5 to 15% of the width of the seed tape in the non-folded state thereof. As a result the seeds or the granulate portions do not unintendedly disappear from the tape even though they should come loose from the adhesive on the paper.

According to the invention the paper layers may be made of kraft paper with a high wet strength or of a gauze-like material, which turned out to be particularly advantageous because then the paper can absorb a heavy amount of water without going to pieces.

Furthermore, the paper-layers may according to the invention be made of a thin nonwoven fibre material (vlies; nonwoven fabric). A "thermodormancy"-state of the seed tape may arise if said seed tape has been unintendedly stored at a too high temperature, and such a "thermodormancy"-state can be ended in a relatively easy manner by adding ethylene to the seed tape because said ethylene can penetrate relatively easy through the thin fibre material. This "thermodor-mancy"-state can for instance apply to lettuce seeds.

Moreover the seed tape may according to the invention be of a width of 10 to 50 mm, and the individual planar members may be of a width of 10 to 30 mm, preferably 15 to 20 mm, which turned out to be particularly advantageous in connection with vegetable seeds.

According to the invention the stripe of SAP may be of a width of 3 to 10 mm, especially 4 to 6 mm, preferably 5 mm, which turned out to be advantageous in connection with most types of seeds. Much room remains for the SAP-grains after said grains through swelling have reached their maximum volume upon the terminating watering.

Moreover, the stripe of SAP may according to the invention be placed substantially perpendicular to the longitudinal axis of the seed tape with the result that an easy application of said stripe in connection with the manufacture of the seed tape is obtained.

According to the invention the SAP-material is advantageously a substance selected among cross-linked polyacrylic acids, cross-linked isobutylene-maleic acid-copolymer derivatives, salts of cross-linked starch-polyacrylic acid, salts of cross-linked polyvinylalcohol-polyacrylic acid, cross-linked polyvinylalcohol derivatives, cross-linked polyethylene-glycol derivatives and cross-linked carboxymethylcellulose derivatives.

Furthermore, the adhesive forming part of of the adhesive layer may according to the invention advantageously be polyvinylacetate, polyvinylalcohol, polyethyleneglycol, polyacrylate or acrylic acid ester-copolymer.

According to the invention the seed may advantageously be placed more than 2 mm from the upper rim of the seed tape.

Moreover hydrophobic powder, such as hydrophobic silica, calcium stearate, magnesium stearate or barium stearate may be added to the stripe of SAP-material, preferably to the portion of said stripe positioned in the lower part of the germinating unit when said germinating unit is to be bedded out. As a result, the SAP-grains are filled with water at a faster rate than previously especially during the second step of the germinating process involving a feeding of considerable amounts of water to the germinating unit so as to fill said SAP-grains completely with water. In addition, the air optionally present in the spaces between the SAP-grains before the watering can remain completely or partially in the germinating unit.

According to the invention one or more of the paper layers may be perforated by holes of a diameter of 0.1 to 0.3 mm, preferably 0.2 mm, and the number of holes may be 7 to 10 per $cm^2$, preferably 9 per $cm^2$. As a result both air and water can easily penetrate into the germinating unit during the two steps of the germinating process.

Moreover, one or both paper layers may be perforated by means of cuts, each cut preferably being of a length of 1.5 to 3.0 mm and for instance being open at one rim of the seed tape, whereby an additional possibility of feeding air (oxygen) to the seed has been achieved.

According to the invention the SAP-grains may advantageously be smaller than 600 $\mu$m, and preferably be of a size in the range of 200 to 600 $\mu$m.

Furthermore, the SAP-material, such as the SAP-grains and optionally also the seed, the additives and the carrier may according to the invention be encased in a plate-shaped carrier, such as glued or woven cellulose or plastic fibres or nonwoven fabric with the result that during the manufacture of the seed tape it is possible to apply the SAP-stripe, and optionally also the seed, the additives and the carrier onto one of the paper layers in a particularly accurate manner.

According to the invention the adhesive of the adhesive layer can be activated by means of a pressure, ultrasound or heat with the effect that a very simple manufacture of the seed tape is obtained.

Moreover, the SAP-material may according to the invention be in form of thin sticks, threads or staple fibres, preferably of a fineness of 10 to 30 denier, whereby said staple fibres for instance are of a length of 3 to 4 mm. The resulting fixing of the SAP-material to the paper layers has been improved. The SAP-material adjacent the rims of the seed tape cannot easily come loose and fall out of each planar member.

According to the invention the threads of SAP-material may be woven into the carrier material with the result that it is possible in a particularly efficient and simple manner to ensure a correct positioning of said SAP-material in each planar member.

The invention relates also to a germinating unit cut off the seed tape according to the invention.

It should be noted that the invention is preferably used on bare seeds. The previous reference to each germinating unit containing a seed is included so as to facilitate the explanation. Each germinating unit can include many seeds instead of only one seed.

BRIEF DESCRIPTION OF THE DRAWINGS

The invention is explained in detail below with reference to the accompanying drawing, in which.

BEST MODE FOR CARRYING OUT THE INVENTION

Figure 1:
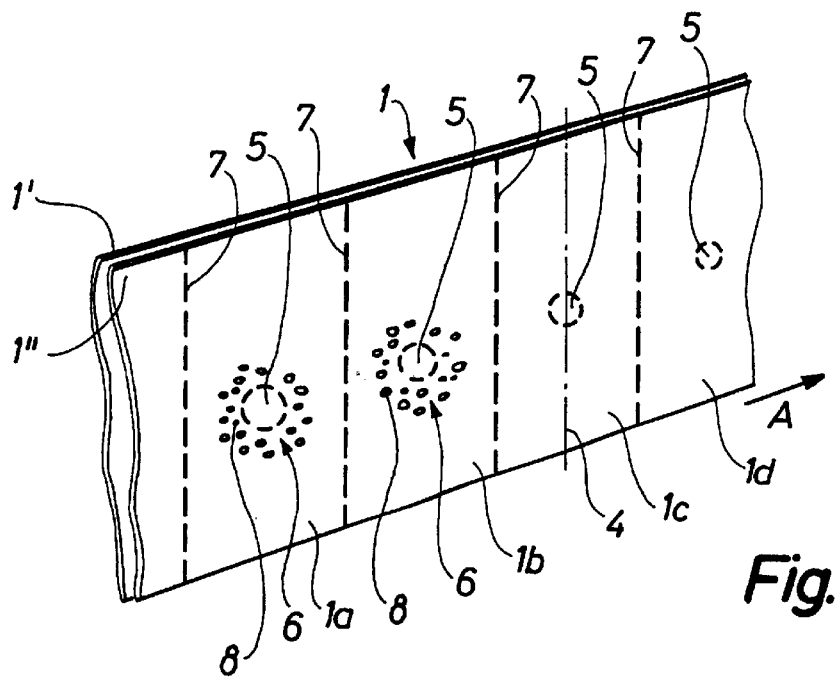
FIG. 1 is a front view of an embodiment placed edgewise of the seed tape according to the invention.

FIG. 1 illustrates an embodiment of a seed tape 1 intended for use in connection with a controlled germinating process, preferably a two-step germinating process. The tape is made of successively arranged germinating units 1a, 1b, 1c, 1d, where each germinating unit includes a seed 5, additives 6 in solid form (granules) and a carrier 8 also in solid form (granules).

Figure 2:
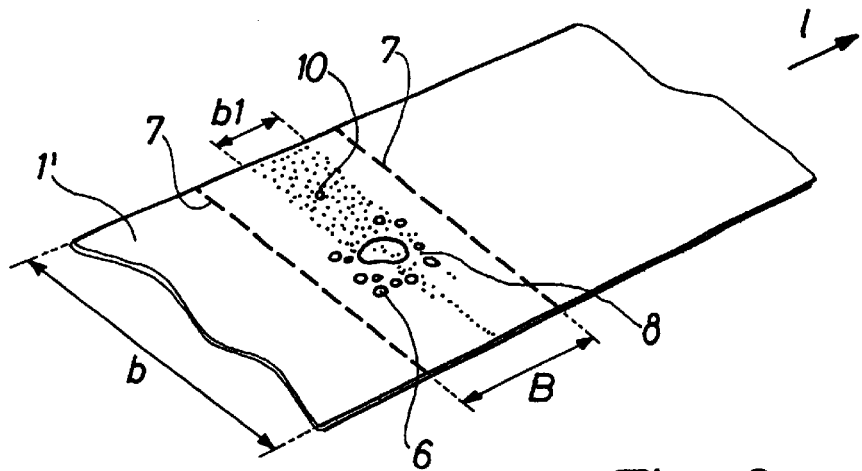
FIG. 2 illustrates a horizontal portion of the embodiment of FIG. 1, whereby the upper paper layer of the two paper layers of the seed tape has been removed and the adhesive layer has been omitted.

The tape is made of two paper layers 1' and 1", where at least one of the paper layers is rather air-permeable. The paper layers are glued together by means of an adhesive layer on at least one of the paper layers. The adhesive layer is indicated at 37 in FIG. 9. The dividing lines between the individual germinating units are indicated at 7. Thus each germinating unit is formed as an oblong planar member 1a, 1b, 1c, 1d. The granules of the adhesives 6 and the carrier are as indicated placed in discrete locations around the seed 5, air applying between said granules and said seed. The seed 5, the additives 6 and the carrier 8, are adhered to the inner face of at least one paper layer 1' by means of the above adhesive layer. As illustrated in FIG. 2, a rather wide stripe of water-absorbing polymer (SAP) 10 is applied onto the adhesive layer on the inner face of for instance the paper layer 1', viz. inside each planar member 1a, 1b, 1c, 1d. This wide stripe of water-absorbing polymer (SAP) 10 extends to both ends of the planar member, viz. to both rims of the seed tape, and passes across the seed 5. This stripe 10 can optionally extend merely from one of the ends of the planar member and to the seed 5 and not further, cf. FIG. 7. Likewise the SAP-stripe 10' can pass the seed at a short distance, cf. the right end of FIG. 7.

Figure 3:
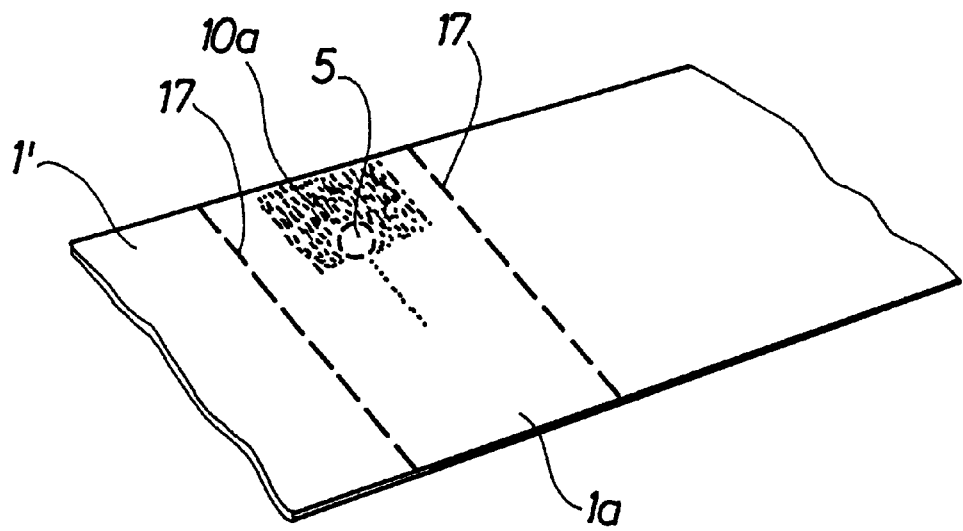
FIG. 3 illustrates a second embodiment of the seed tape according to the invention, where the upper paper layer of the tape has been removed.

When the seed 5 is placed in the upper portion, preferably the upper fourth part of the germinating unit, hydrophilic material, such as silica powder, clay particles, vermiculite or perlite can be added especially to the part 10a of the stripe 10, cf. FIG. 3, which is above the seed 5 in the bedded out state of the germinating unit.

In the above SAP-stripe, the size and amount of the SAP-grains are selected such that the SAP can at least hold a twentieth part of the amount of water necessary for provoking the completing germinating process of the seed. As a result, the said stripe is able to absorb the exact amount of water required for carrying out a priming, before the completing germination if the seed is carried out after a break of for instance 5 to 14 days. The seeds are typically seeds of spinach, carrots and onions always being subjected to a priming. The first step of the germinating process, viz. the priming, allows entrance of not only a very small of water to the seed, but also of air (oxygen) through the air-permeable paper wall. The microclimate, especially the moisture, around the seed is controlled on the basis of the SAP-stripe. The second step of the germinating process allows entrance of both water, in large amounts, and of air (oxygen) to the radicles. The seed tape according to the invention turned out to be suited in connection with both steps of the germinating process.

Figure 6:
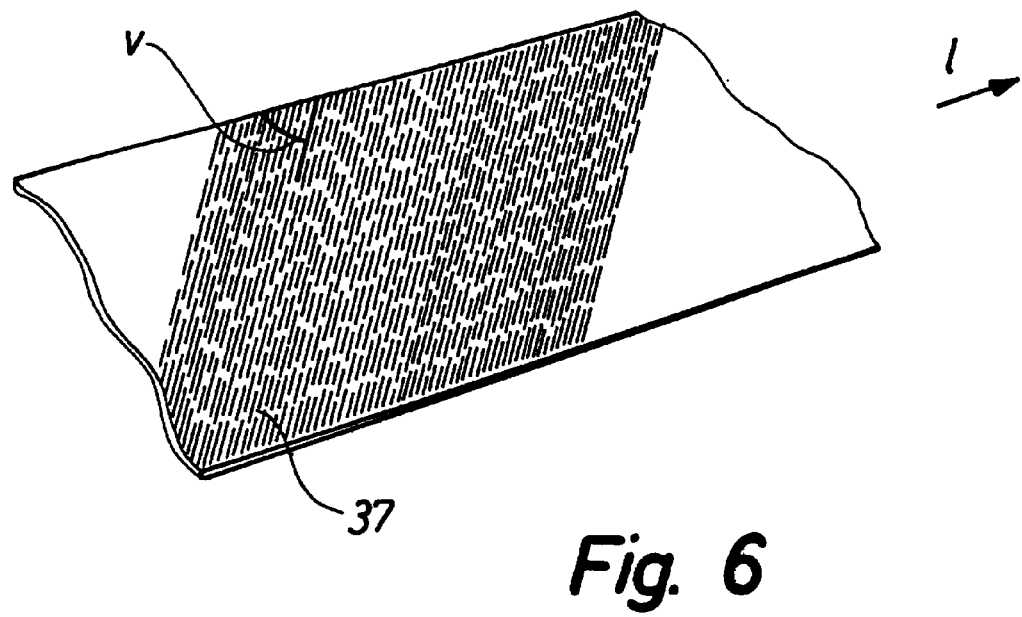
FIG. 6 illustrates a fifth embodiment of the seed tape according to the invention, where the substantially parallel adhesive lines of the adhesive layer form an angle of approximately 55° with the longitudinal direction 1 of the seed tape.
Figure 9:
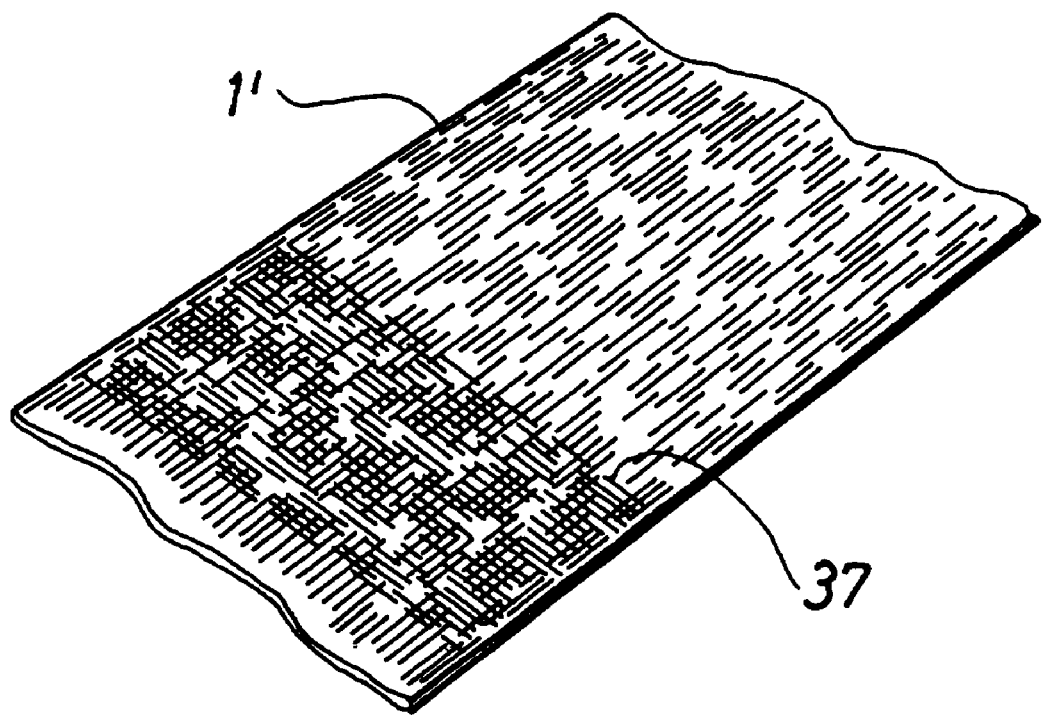
FIG. 9 illustrates one paper layer of a seed tape, where the adhesive lines of the adhesive layer clearly appear, said lines extending parallel and perpendicular to the longitudinal direction of said seed tape.

In FIG. 9 the adhesive layer is made of many parallel and adjacent adhesive lines 37 which are parallel either to the longitudinal direction of the seed tape or to the direction perpendicular to said longitudinal direction. As illustrated in FIG. 6 it is possible for the adhesive lines 27 of the adhesive layer to form an angle v with the longitudinal direction of the seed tape of 45 to 70°, preferably 50 to 60°. In FIG. 6 v is approximately 55°.

Figure 7:
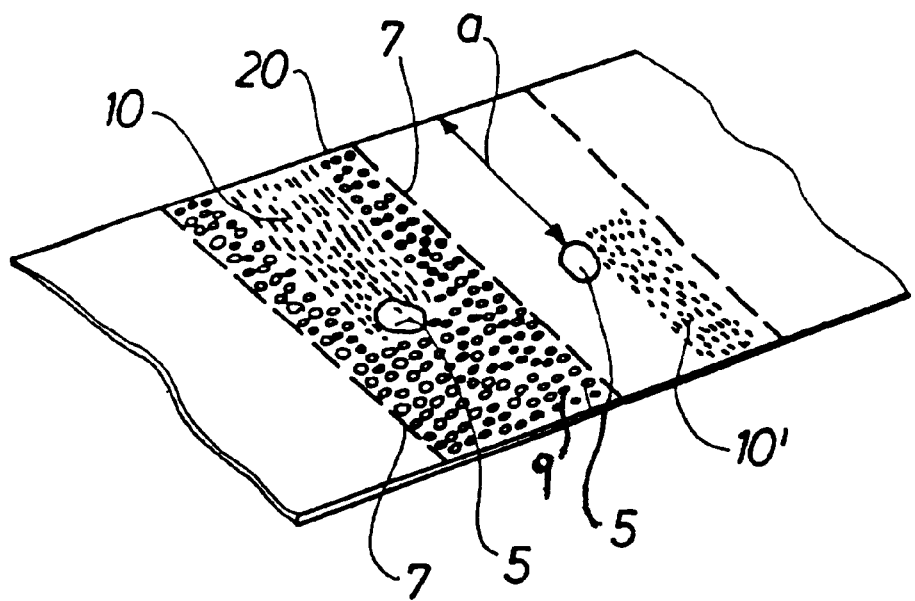
FIG. 7 illustrates a seed tape, where the upper paper layer has been removed, and showing how a wide stripe of SAP-material can be placed.

As illustrated in FIG. 7, the adhesive layer can be applied in form of many juxtaposed adhesive drops 9.

Concerning the used adhesive 9, 27, 37 it should be noted that the adhesiveness thereof is slightly weaker than the expansion force exerted by the polymer material when it is caused to absorb water. The adhesive presents an adhesiveness of approximately 28 g*per cm or less, preferably less than 20 g*/cm. The adhesiveness is here measured by the force in g*/cm necessary for separating two paper layers adhered by means of the adhesive in question and of a width of 5 cm and a length of 20 cm. On the 5 cm wide stripe, a force of approximately 100 g* is measured which corresponds to the said approximate 20 g*per cm.

Figure 4:
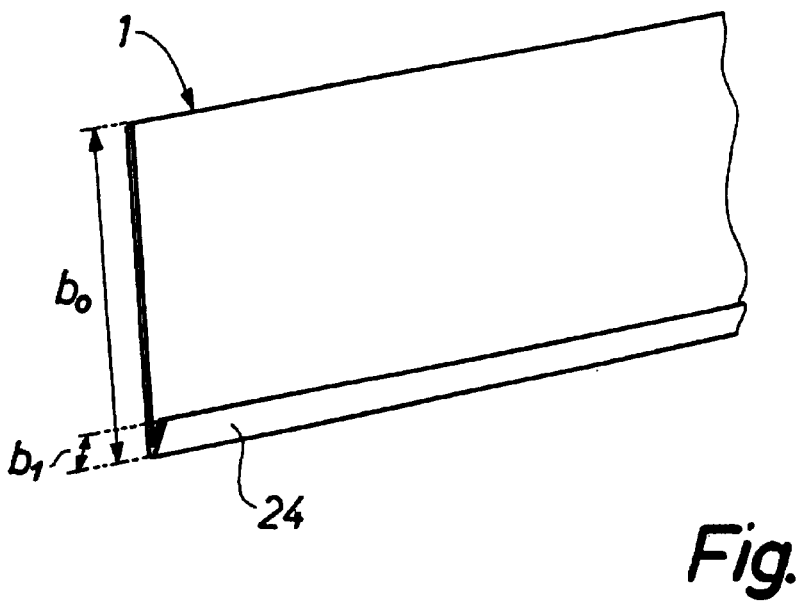
FIG. 4 illustrates a third embodiment of the seed tape according to the invention, where one end of the planar members of the seed tape has been folded.

FIG. 4 illustrates how the lower portion of both paper layers 1' and 1", viz. the portion later on abutting the earth, can be folded to the same side, said lower portion in FIG. 4 being indicated at 24 and preferably being of a width of $b_1$ of 5 to 15% of the width $b_1+b_o$ of the tape in the non-folded state thereof.

Figure 5:
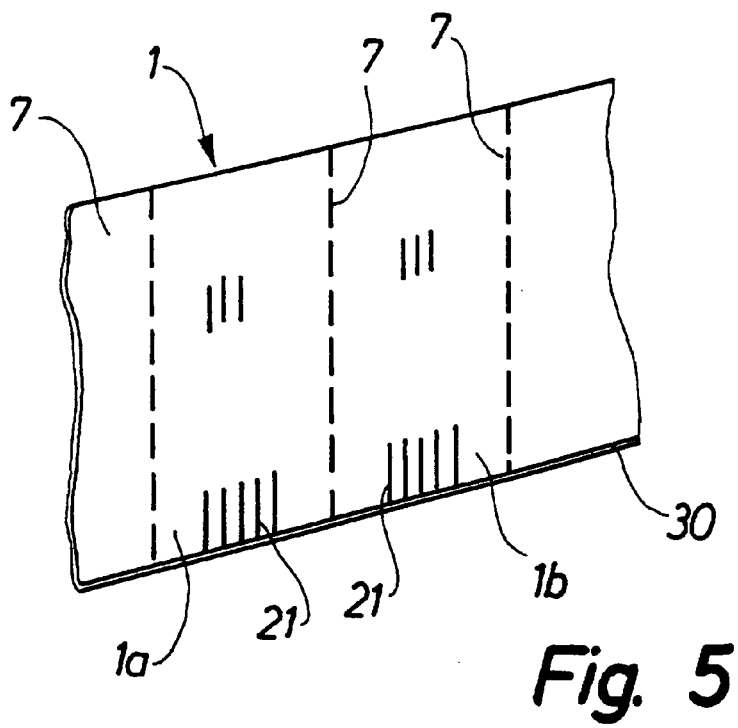
FIG. 5 illustrates a fourth embodiment of the seed tape according to the invention, where the individual planar members inter alia in the lower half present some parallel slits.

FIG. 5 illustrates how the lower half of each planar member 1a, 1b, 1c, 1d can comprise a plurality of substantially parallel slits 21 extending through one or both paper layers and being open at the adjacent rim 30 of the tape 1. The cuts can be of a length of 1.5 to 3.0 mm. The paper layers can be made of kraft paper with a high wet strength, but can also be made of a gauze-like material. In addition, the "paper" layers can be made of a thin nonwoven material (vlies; nonwoven fabric). Each seed tape is preferably of a width b of 10 to 50 mm, and each planar member can be of a width B of 10 to 30 mm, preferably 15 to 20 mm. When for instance it is a question of cabbage seed, the seed tape can be 10 mm wide and each planar member be 15 mm wide. When it is a question of corn seeds, the corresponding dimensions can be 25 and 20 mm, respectively.

The stripe 10 of SAP-material, cf. FIGS. 2 and 7, can be of a width b1 of 3 to 10 mm, especially 4 to 6 mm, preferably 5 mm. In this connection it should be noted that the SAP-material is usually available in form of a very fine, almost invisible powder. The weight of SAP-material for a single planar member is typically in the range of approximately 0.00025 to 0.0045 g, which means that the grains of each stripe can barely be seen with the naked eye. The grains, viz. the granules, can present a diameter of less than 600 μm.

The stripe of SAP-material 10 can be placed substantially perpendicular to the axis 1 of the seed tape, cf. FIG. 2. It appears from FIG. 7 how the stripes 10, 10' can be placed in various ways relative to the seed 5. As mentioned above, the stripe 10' can be placed slightly staggered relative to the seed 5.

The SAP-material used in the stripes 10, 10' can for instance be a substance selected among cross-linked polyacrylic acids, cross-linked isobutylene-maleic acid-copolymer derivatives, salts of cross-linked starch-polyacrylic acid, salts of cross-linked polyvinylalcohol-polyacrylic acid, cross-linked polyvinylalcohol derivatives, cross-linked polyethylene-glycol derivatives and cross-linked carboxymethylcellulose derivatives.

The adhesive used in the adhesive layer 27, 37 can be polyvinylacetate, polyvinylalcohol, polyethyleneglycol, polyacrylate or acrylic acid ester-copolymer.

When the present description refers to each germinating unit 1a, 1b 1c including a seed 5, it should be understood such that the germinating unit, viz. the planar member, in some situations can include several seeds, such as in the situation where it is a question of onion, carrot and spinach seeds or seeds for various aromatic plants being cultivated in clusters.

Each seed 5 can be positioned rather close to the seed tape rim 20 positioned on top in the earth when said seed tape is bedded out. The distance a from the seed 5 to the rim 20, cf. FIG. 7, can in some situations be as short as 2 mm, usually not shorter.

As shown in FIG. 7, hydrophobic, viz. water-repellent powder, such as hydrophobic silica, calcium stearate, magnesium stearate or barium stearate can be added to the stripe 10' of SAP-material, preferably to the portion of said stripe which is placed at the bottom in the earth once the tape has been bedded out.

The individual SAP-granulates can be smaller than 60 μm, but are preferably of a size in the range of 200 to 600 μm.

Figure 8:
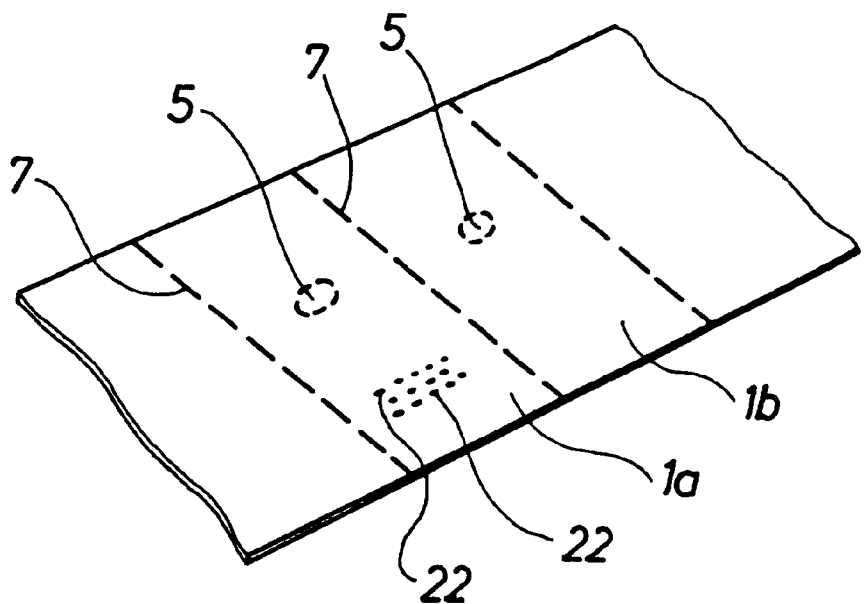
FIG. 8 illustrates a seed tape in which perforations are formed in the paper wall.

FIG. 8 shows how one or more of the paper layers can be perforated by circular holes 22 with a diameter of 0.1 to 0.3 mm, preferably 0.2 mm. The holes and the hole interspaces have been exaggerated for the sake of clarity. The number of holes is 7 to 10 per cm$^2$, preferably 9 holes per cm$^2$.

The SAP-material, such as the SAP-grains in the stripe 10, cf. for instance FIG. 2, and optionally also the seed(s), the additives and the carrier can be encased in a plate-shaped carrier not shown of for instance glued or woven cellulose or plastic fibres or nonwoven fabric with the result that the stripe can be easily adhered in the correct position.

When the stripe 10 of SAP-grains extends from the very upper rim of the seed tape to the lower rim of said tape, each planar member 1a, 1b, 1c and 1d can be described as a small flattened tube.

The adhesive of the adhesive layer 27, 37 can, if desired, be activatable for instance by means of a pressure, ultrasound or heat, whereby the resulting manufacture of the said planar member 1a, 1b, 1c and 1d has been facilitated.

Instead of grains, the SAP-material can be available in form of thin sticks, threads or staple fibres, preferably of a fineness of 10 to 30 denier, whereby said staple fibres for instance are of a length of 3 to 4 mm. These threads can, if desired be woven into the above plate-shaped carrier material. One advantage of the invention is found in the fact that when it is necessary to include a priming of the seeds, it is possible to carry out this priming in a very reliable and simple manner at the same time as it is possible to obtain a very fast, reliable and very homogeneous priming of said seeds during the second germination step. If desired, it is possible to include a break of up to several weeks between the first and the second germination step, and by way of a cooling to 2 to 5° C. it is possible to further prolong this break. The priming is usually carried out at 10 to 35° C., preferably at 18 to 25° C. When it is a question of sugar beet seeds, a break of typically approximately 14 days applies between the termination of the priming and the initiation of the completing germinating process. The latter also applies to seeds of spinach, onions, carrots, cabbage and lettuces.

The term "planar member" is here to be construed as a relatively small, substantially rectangular or parallelogram-shaped body, which is relatively thin as well.

What is claimed is:

1. A seed tape for a controlled germinating process and comprising successively arranged germinating units, where said germinating units can be cut off one by one, said seed tape being made of at least two paper layers and intended to be used while arranged edgewise, and where each germinating unit includes a seed, additives and a carrier, characterised in that, each germinating unit is formed as a planar member, the longitudinal axis of which extends substantially transverse to or inclined relative to the longitudinal direction of the seed tape, and that the additives and the carrier are present in form of granules and are arranged in discrete locations around the seed, air applying between said seed and the additives and the carrier, and that the seed, the additives and the carrier are adhered to one air-permeable paper layer by means of a layer of adhesive on the inner face of said paper layer, and that at least one stripe of water-absorbing, super-absorbing polymer (SAP) extending across the seed or past said seed at a short distance therefrom and such that it at least reaches one end of the planar member when seen in a direction perpendicular to the longitudinal direction of the seed tape and is able to absorb the exact amount of water required for carrying out of priming, characterized in that the individual SAP granules are smaller than 600 μm.

2. The seed tape as claimed in claim 1, characterised in that the SAP-material, including the SAP-grains and also the seeds, the additives and the carrier are encased in a plate-shaped carrier material of glued or woven cellulose or plastic fibres or nonwoven fabric.

3. The seed as claimed in claim 1, characterised in that the adhesive in the adhesive layer is activatable by means of pressure, ultrasound or heat.

4. The seed tape as claimed in claim 1, characterised in that the SAP-material is available in form of thin sticks, threads or staple fibres of a fineness of 10 to 30 denier, where said staple fibres are of a length of 3 to 4 mm.

5. The seed tape as claimed in claim 2, characterised in that the threads of SAP-material are woven into the carrier material.

6. A germinating unit cut off the seed tape as claimed 1.

* * * * *